(12) United States Patent
Mattox, Jr. et al.

(10) Patent No.: US 7,979,411 B2
(45) Date of Patent: Jul. 12, 2011

(54) RELATING PEOPLE FINDING RESULTS BY SOCIAL DISTANCE

(75) Inventors: Gregory Thomas Mattox, Jr., Bellevue, WA (US); Puneet Narula, Redmond, WA (US); Venkatesh Veeraraghavan, Seattle, WA (US); Bryant Fong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 11/438,423

(22) Filed: May 22, 2006

(65) Prior Publication Data

US 2007/0271232 A1    Nov. 22, 2007

(51) Int. Cl.
*G06F 17/30* (2006.01)
*G06F 7/00* (2006.01)

(52) U.S. Cl. ......... 707/706; 707/726; 707/732; 705/319
(58) Field of Classification Search .................. 707/706, 707/726, 732; 705/319
See application file for complete search history.

(56) References Cited

U.S. PATENT DOCUMENTS

| | | | |
|---|---|---|---|
| 4,221,003 A | 9/1980 | Chang | |
| 6,665,668 B1 * | 12/2003 | Sugaya et al. | 707/6 |
| 6,694,459 B1 | 2/2004 | Nyman | |
| 6,968,179 B1 | 11/2005 | De Vries | |
| 7,321,886 B2 | 1/2008 | Swaminathan | |
| 7,519,542 B1 | 4/2009 | Waingold | |
| 2002/0059201 A1 * | 5/2002 | Work | 707/3 |
| 2002/0167539 A1 | 11/2002 | Brown | |
| 2003/0004782 A1 | 1/2003 | Kronby | |
| 2003/0093405 A1 | 5/2003 | Mayer | |
| 2003/0135725 A1 | 7/2003 | Schirmer et al. | |
| 2004/0054691 A1 | 3/2004 | Sharma et al. | |
| 2004/0083213 A1 | 4/2004 | Wu et al. | |
| 2004/0117444 A1 | 6/2004 | Goodman | |
| 2004/0128322 A1 | 7/2004 | Nagy | |
| 2004/0148275 A1 | 7/2004 | Achlioptas | |
| 2004/0215793 A1 | 10/2004 | Ryan | |
| 2004/0220902 A1 | 11/2004 | Gates et al. | |
| 2005/0043060 A1 | 2/2005 | Brandenberg | |
| 2005/0246314 A1 | 11/2005 | Eder | |
| 2005/0246420 A1 | 11/2005 | Little, II | |
| 2005/0256756 A1 | 11/2005 | Lam et al. | |

(Continued)

FOREIGN PATENT DOCUMENTS

WO    WO 02/01405 A1    1/2002

(Continued)

OTHER PUBLICATIONS

Dumais et al., "Stuff I've seen: a system for personal information retrieval and re-use", © 2003 by ACM, from the Proceedings of the 26th annual international ACM SIGIR conference on Research and development in informaion retrieval, pp. 72-79.*

(Continued)

*Primary Examiner* — Jacob F Bétit
(74) *Attorney, Agent, or Firm* — Merchant & Gould P.C.

(57) ABSTRACT

Search results are displayed according to relevance and grouped by the social distance between the person associated with the profile and the user performing the search. Metadata is defined of each of the profiles indicating groups affiliated the profile and a relevance value is determined as a function of the metadata for each of the profiles in the result set. The social distance is determined as a function of a colleague designation associated with the profile.

9 Claims, 11 Drawing Sheets

U.S. PATENT DOCUMENTS

2006/0136419 A1* 6/2006 Brydon et al. .................. 707/9
2006/0259340 A1 11/2006 Doherty
2008/0243789 A1 10/2008 Kussmaul
2009/0006333 A1 1/2009 Jones

FOREIGN PATENT DOCUMENTS

WO    WO 2005/015470 A1    2/2005

OTHER PUBLICATIONS

Borghoff et al.; "Adaptive Refinement of Search Patterns for Distributed Information Gathering"; Proc. Int. Conf. Euroedia/WEBTEC; Dec. 19-21, 1996, pp. 5-12; printed from http://www2-data.informatik.unibw-muenchen.de/People/borghoff/pspapers/euromedia96.pdf; The Society for Computer Simulation; U.S.

Hertzum et al.; "The information-seeking practices of engineers: searching for documents as well as for people"; Information Processing and Management 36; 2000; pp. 761-778; printed from http://www.ad.jyu.fi/users/a/ankarjal/ITKD50/Hertzum_information%20seeking%20engineers.pdf; Elsevier Science, Ltd.; U.K.

Kautz et al.; "Combining Social Networks and Collaborative Filtering"; Communications of the ACM; Mar. 1997; pp. 63-65; vol. 40 No. 3; printed from http://delivery.acm.org/10.1145/50000/45123/p63-kautz.pdf?key1=245123&key2=7440245411&coll=GUIDE&dl=GUIDE&CFID=9715639&CFTOKEN=36586103; ACM Press, U.S.

Tomita et al.; "Interactive Web search by graphical query refinement"; 6 pgs.; printed from http://www10.org/cdrom/posters/p1078/; Poster Proceedings of the 10th International WWW Conference, 2001, Hong Kong.

Chen et al., "Peer-to-Peer Knowledge Sharing in Collaboration Supported Virtual Learning Communities" IEEE Computer Society, © 2006, 3 pages.

Wikipedia, "Rating Sites" last modified Jun. 18, 2009, 4 pages.

Wikipedia, "Yahoo! Answers" last modified Jun. 12, 2009, 6 pages.

Yang et al., "A Social Network-Based System for Supporting Interactive Collaboration in Knowledge Sharing over Peer-to-Peer Network" International Journal Human-Computer Studies 66, 2008, 15 pages.

* cited by examiner

FIG. 6

| HOME » | TASKS AND TOOLS | TOPICS | SEARCH CENTER | SITE DIRECTORY | HELP |

HOME > SEARCH CENTER > SEARCH RESULTS

EVERYTHING  OFFICE PORTAL  PEOPLE  DISCUSSIONS  DOCUMENTS  MORE...

| AUDIO FORMATS | | ⇧ MORE SEARCH OPTIONS |

SEARCH FOR AUDIO FORMATS IN PEOPLE       RESULTS 1-10 OF ABOUT 23

PEOPLE RESULTS – GROUP BY SOCIAL DISTANCE – VIEW MORE PEOPLE

REFINE YOUR SEARCH

REFINE RESULTS BY DEPARTMENT
- HOME & ENTERTAINMENT
- MARKETING
- PRODUCT SUPPORT
- SERVICES
- PUBLIC RELATIONS
- LEGAL

VIEW MORE DEPARTMENT FILTERS

REFINE RESULTS TITLE
- PRODUCT DEVELOPER
- MARKET ANALYST
- SUPPORT PROFESSIONAL
- SALES REPRESENTATIVE
- DIVISION MANAGER

VIEW MORE TITLE FILTERS

REFINE WITH ADDITIONAL PEOPLE SEARCH OPTIONS...

SEAN MCDONALD
PRODUCT DEVELOPER – HOME & ENTERTAINMENT -X55
WELCOME TO MY PERSONAL SITE. I TRY TO KEEP THE AS ACCURATE AS POSSIBLE. FOR AUDIO FORMAT QUESTIONS...
RESPONSIBILITIES: AUDIO INTEGRATION; AUDIO LIBRARY - ADD TO MY COLLEAGUES

BOBBI CLARK
PRODUCT DEVELOPER – HOME & ENTERTAINMENT -X55
I'M A PRODUCT DEVELOPER FOCUSING ON AUDIO PRODUCTS EXTENSIBILITY.
RESPONSIBILITIES: AUDIO EXTENSIBILITY - ADD TO MY COLLEAGUES

JAKE FARROW
PRODUCT DEVELOPER – MOBILITY X55
RESPONSIBILITIES: AUDIO PRODUCTS - ADD TO MY COLLEAGUES

KEVIN CORNER
LEAD PRODUCT DEVELOPER – HOME & ENTERTAINMENT -X55
I'M A MOBILITY PD WORKING ON RESEARCH INTO AUDIO FORMATS... SYNC END-USER EXPERIENCE FAQ FORMAT DETAILS STILL IN DEVELOPMENT.
INTERESTS: AUDIO COMPRESSION; AUDIO FORMATS - ADD TO MY COLLEAGUES

FIG. 7

| HOME ▽ | TASKS AND TOOLS | TOPICS | SEARCH CENTER | SITE DIRECTORY | HELP |

HOME > SEARCH CENTER > SEARCH RESULTS

EVERYTHING  OFFICE PORTAL  PEOPLE  DISCUSSIONS  DOCUMENTS  MORE...

REFINE YOUR SEARCH

| AUDIO FORMATS | | ⇧ MORE SEARCH OPTIONS |

REFINE RESULTS BY DEPARTMENT
- HOME & ENTERTAINMENT
- MARKETING
- PRODUCT SUPPORT

SEARCH FOR AUDIO FORMATS IN PEOPLE       RESULTS 1-10 OF ABOUT 23

PEOPLE RESULTS – VIEW BY RELEVANCE – VIEW MORE PEOPLE

SERVICES
- PUBLIC RELATIONS
- LEGAL

VIEW MORE DEPARTMENT FILTERS

MY COLLEAGUES [1 DEGREE OF DISTANCE]
<u>KEVIN CORNER</u>
LEAD PRODUCT DEVELOPER – HOME & ENTERTAINMENT -X55
I'M A MOBILITY PD WORKING ON RESEARCH INTO AUDIO FORMATS.... SYNC
END-USER EXPERIENCE FAQ FORMAT DETAILS STILL IN DEVELOPMENT.
INTERESTS: AUDIO COMPRESSION: AUDIO FORMATS - <u>ADD TO MY COLLEAGUES</u>

REFINE RESULTS TITLE
- PRODUCT DEVELOPER
- MARKET ANALYST
- SUPPORT PROFESSIONAL
- SALES REPRESENTATIVE
- DIVISION MANAGER

MY COLLEAGUES' COLLEAGUES [2 DEGREES OF DISTANCE]
<u>SEAN MCDONALD</u>
PRODUCT DEVELOPER – HOME & ENTERTAINMENT -X55
WELCOME TO MY PERSONAL SITE. I TRY TO KEEP THE AS ACCURATE AS
POSSIBLE. FOR AUDIO FORMAT QUESTIONS...
RESPONSIBILITIES: AUDIO INTEGRATION: AUDIO LIBRARY - <u>ADD TO MY COLLEAGUES</u>

VIEW MORE TITLE FILTERS

<u>JAKE FARROW</u>
PRODUCT DEVELOPER – MOBILITY X55
RESPONSIBILITIES: AUDIO PRODUCTS - <u>ADD TO MY COLLEAGUES</u>

REFINE WITH ADDITIONAL PEOPLE SEARCH OPTIONS...

EVERYONE ELSE [3 OR MORE DEGREES OF DISTANCE]
<u>BOBBI CLARK</u>
PRODUCT DEVELOPER – HOME & ENTERTAINMENT -X55
I'M A PRODUCT DEVELOPER FOCUSING ON AUDIO PRODUCTS EXTENSIBILITY.
RESPONSIBILITIES: AUDIO EXTENSIBILITY - <u>ADD TO MY COLLEAGUES</u>

FIG. 9

| HOME▼ | TASKS AND TOOLS | TOPICS | SEARCH CENTER | SITE DIRECTORY | | HELP |

HOME > SEARCH CENTER > SEARCH RESULTS

EVERYTHING   OFFICE PORTAL   PEOPLE   DISCUSSIONS   DOCUMENTS   MORE...

REFINE YOUR SEARCH

REFINE RESULTS BY DEPARTMENT
- HOME & ENTERTAINMENT
- MARKETING
- PRODUCT SUPPORT
- SERVICES
- PUBLIC RELATIONS
- LEGAL

VIEW MORE DEPARTMENT FILTERS

REFINE RESULTS TITLE
- PRODUCT DEVELOPER
- MARKET ANALYST
- SUPPORT PROFESSIONAL
- SALES REPRESENTATIVE
- DIVISION MANAGER

VIEW MORE TITLE FILTERS

REFINE WITH ADDITIONAL PEOPLE SEARCH OPTIONS...

SKILLS: C#    [⇧] MORE SEARCH OPTIONS

SEARCH FOR SKILLS: C# IN PEOPLE    RESULTS 1-10 OF ABOUT 23

PEOPLE RESULTS – VIEW BY FLAT RELEVANCE – VIEW MORE PEOPLE

MY COLLEAGUES [1 DEGREE OF DISTANCE]

KEVIN CORNER
LEAD PRODUCT DEVELOPER – MOBILITY X55
I'M A MOBILITY PD WORKING ON RESEARCH INTO MOBILE MEDIA...SYNC END-USER EXPERIENCE FAQ. CENTER DETAILS STILL IN DEVELOPMENT
SKILLS: C#; PASCAL; AUDIO COMPRESSION

MY COLLEAGUES' COLLEAGUES [2 DEGREES OF DISTANCE]

SEAN MCDONALD
PRODUCT DEVELOPER – HOME & ENTERTAINMENT X55
WELCOME TO MY PERSONAL SITE. I TRY TO KEEP THE INFORMATION UP TO DATE AND AS ACCURATE AS POSSIBLE. TIME SOMETIMES PREVENTS...
SKILLS: C#; - ADD TO MY COLLEAGUES

JAKE FARROW
PRODUCT DEVELOPER – HOME & ENTERTAINMENT -X55
SKILLS: C#; JAVA; J# - ADD TO MY COLLEAGUES

EVERYONE ELSE [3 OR MORE DEGREES OF DISTANCE]

BOBBI CLARK
LEAD PRODUCT DEVELOPER – HOME & ENTERTAINMENT -X55
I'M A PRODUCT DEVELOPER FOCUSING ON PRODUCT EXTENSIBILITY
SKILLS: C#; C; C++ - ADD TO MY COLLEAGUES

FIG. 10

| HOME ▼ | TASKS AND TOOLS | TOPICS | SEARCH CENTER | SITE DIRECTORY | HELP |

HOME > SEARCH CENTER > SEARCH RESULTS

EVERYTHING  OFFICE PORTAL  PEOPLE  DISCUSSIONS  DOCUMENTS  MORE...

[PAT SMITH] ⇑ ADVANCED SEARCH

REFINE YOUR SEARCH

REFINE RESULTS BY DEPARTMENT
- HOME & ENTERTAINMENT
- MARKETING
- PRODUCT SUPPORT
- SERVICES
- PUBLIC RELATIONS
- LEGAL

VIEW MORE DEPARTMENT FILTERS

REFINE RESULTS TITLE
- PRODUCT DEVELOPER
- MARKET ANALYST
- SUPPORT PROFESSIONAL
- SALES REPRESENTATIVE
- DIVISION MANAGER

VIEW MORE TITLE FILTERS

REFINE WITH ADDITIONAL PEOPLE SEARCH OPTIONS...

SEARCH FOR PAT SMITH IN PEOPLE          RESULTS 1-10 OF ABOUT 23

PEOPLE RESULTS – GROUP BY SOCIAL DISTANCE – VIEW MORE PEOPLE

PAT SMITH (MCPC)
PRODUCT DEVELOPER – HOME & ENTERTAINMENT -X55
WELCOME TO MY PERSONAL SITE. I TRY TO KEEP THE INFORMATION UP TO DATE AND AS ACCURATE AS POSSIBLE. TIME SOMETIMES PEVENTS...
ADD TO MY COLLEAGUES

PAT SMITH (JONES)
LEAD PRODUCT DEVELOPER – HOME & ENTERTAINMENT -X55
I'M A PRODUCT DEVELOPER FOCUSING ON PRODUCT EXTENSIBILITY.
ADD TO MY COLLEAGUES

PAT SMITH (MOBILITY)
LEAD PRODUCT DEVELOPER – MOBILITY -X55
I'M A MOBILITY PD WORKING ON RESEARCH INTO MOBILE MEDIA...SYNC END-USER EXPERIENCE FAQ CENTER DETAILS STILL IN DEVELOPMENT
ADD TO MY COLLEAGUES

PAT SMITH (HOME)
DIVISION MANAGER – HOME & ENTERTAINMENT -X55
I'M THE DIVISION MANAGER FOR THE HOME &ENTERTAINMENT DIVISION. OUR DIVISION INCLUDES ALL HOME ENTERTAINMENT PRODUCTS INCLUDING TELEVISIONS, DVD PLAYERS, STEREO...
ADD TO MY COLLEAGUES

FIG. 11

| HOME ▾ | TASKS AND TOOLS | TOPICS | SEARCH CENTER | SITE DIRECTORY | HELP |

HOME > SEARCH CENTER > SEARCH RESULTS

EVERTHING  OFFICE PORTAL  PEOPLE  DISCUSSIONS  DOCUMENTS  MORE...

[PAT SMITH] ⇧ MORE SEARCH OPTIONS

SEARCH FOR PAT SMITH IN PEOPLE    RESULTS 1-10 OF ABOUT 23

PEOPLE RESULTS – VIEW BY FLAT RELEVANCE – VIEW MORE PEOPLE

— MY COLLEAGUES' COLLEAGUES [2 DEGREES OF DISTANCE]

PAT SMITH (MCPC)
PRODUCT DEVELOPER – HOME & ENTERTAINMENT -X55
WELCOME TO MY PERSONAL SITE. I TRY TO KEEP THE INFORMATION UP TO DATE AND AS ACCURATE AS POSSIBLE...
ADD TO MY COLLEAGUES

PAT SMITH (JONES)
LEAD PRODUCT DEVELOPER – HOME & ENTERTAINMENT -X55
I'M A PRODUCT DEVELOPER FOCUSING ON PRODUCT EXTENSIBILITY.
ADD TO MY COLLEAGUES

PAT SMITH (MOBILITY)
LEAD PRODUCT DEVELOPER – MOBILITY -X55
I'M A MOBILITY PD WORKING ON RESEARCH INTO MOBILE MEDIA...SYNC END-USER EXPERIENCE FAQ CENTER DETAILS STILL IN DEVELOPMENT
ADD TO MY COLLEAGUES

— EVERYONE ELSE [3 OR MORE DEGREES OF DISTANCE]

PAT SMITH (HOME)
DIVISION MANAGER – HOME & ENTERTAINMENT -X55
I'M THE DIVISION MANAGER FOR THE HOME &ENTERTAINMENT DIVISION. OUR DIVISION INCLUDES ALL HOME ENTERTAINMENT PRODUCTS INCLUDING TELEVISIONS, DVD PLAYERS, STEREO...
ADD TO MY COLLEAGUES

REFINE YOUR SEARCH

REFINE RESULTS BY DEPARTMENT
- HOME & ENTERTAINMENT
- MARKETING
- PRODUCT SUPPORT

SERVICES
- PUBLIC RELATIONS
- LEGAL

VIEW MORE DEPARTMENT FILTERS

REFINE RESULTS TITLE
- PRODUCT DEVELOPER
- MARKET ANALYST
- SUPPORT PROFESSIONAL
- SALES REPRESENTATIVE
- DIVISION MANAGER

VIEW MORE TITLE FILTERS

REFINE WITH ADDITIONAL PEOPLE SEARCH OPTIONS...

RELATING PEOPLE FINDING RESULTS BY SOCIAL DISTANCE

BACKGROUND

Known computer-implemented search tools perform searches for people and display the results in the same manner as they search for documents. Additionally, both people and document search results are returned and displayed in the same result set. This causes confusion for users because they are often searching for either documents or people, but not both.

Also, once presented with a set of results, the user needs to determine the appropriate person to contact from a given set of results. People naturally find ease in contacting people they know or people that know someone they know directly or through an ad hoc brokering process. Unfortunately, existing people search tools do not provide the result set user in a way that allows the user to easily determine if they know the person in the result set or if someone they know knows the person in the result set.

Using known search tools, the user is also often unsure of the relevance of the people returned in the result set and the reason why they were included. People are often organized to work in groups on particular projects or in areas of expertise, or both. Thus, users are often searching for other people who are working on a particular project or who have particular skills. These groups of people can be expressed in a number of ways including common department names, common security profile groups, and common distribution lists. However, conventional search tools do not provide the result set user in a way that allows the user to easily determine the relevance of the people returned in the result set.

SUMMARY

Embodiments of the invention overcome one or more deficiencies in known methods for displaying profile search results to a user. An aspect of the invention groups search results by the social distance between the person associated with a profile returned in the search and the user performing the search. The social distance may be determined as a function of a colleague designation associated with the profile.

In another aspect, metadata defined for each of the profiles indicates the groups affiliated with the profile. Performing a search on the profiles and the metadata generates an improved result set. A relevance value may be determined as a function of the defined metadata for each of the profiles in the result set and the result set may be displayed according to the relevance value of the profiles.

In yet another aspect of the invention, the social distance between a profile and the user is determined as a function of a colleague designation associated with the profile. Lists containing profiles are created for one or more degrees of social distance as a function of the colleague designation. The profiles in the search result set are then grouped according to the lists and displayed to the user.

Advantageously, computers implementing aspects of the invention simplify how people find and share information across boundaries, thus enabling better informed decisions, with a tool that permits searching for fellow employees and other business contacts and communicates the results of the search to the user in a meaningful way.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIGS. 6, 8, 10 are block diagrams illustrating exemplary graphical user interfaces for people search results in relevance view according to an embodiment of the invention.

FIGS. 7, 9, 11 are block diagrams illustrating exemplary graphical user interfaces for people search results in social distance view according to an embodiment of the invention.

Corresponding reference characters indicate corresponding parts throughout the drawings.

DETAILED DESCRIPTION

Figure 1:
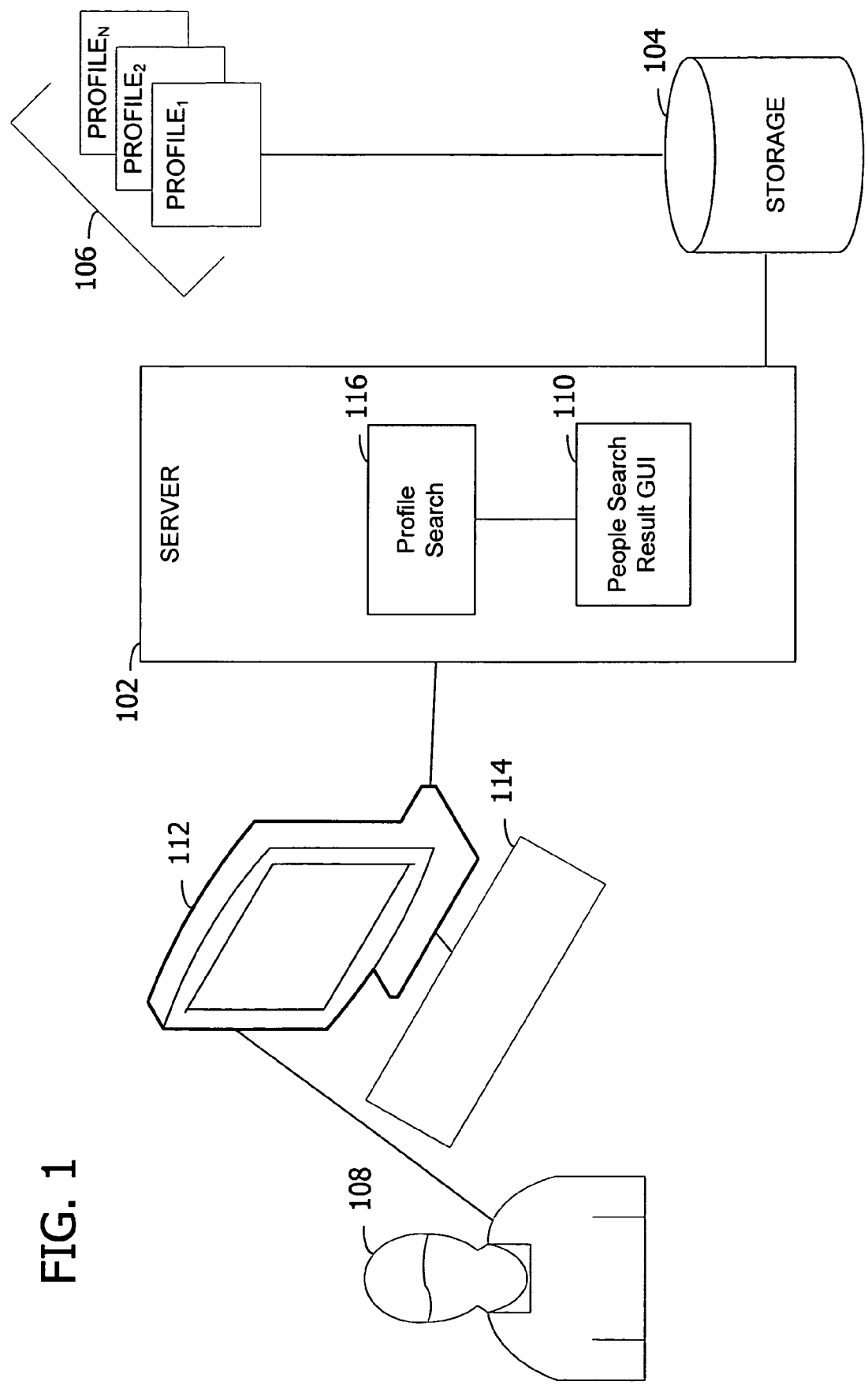
FIG. 1 is a block diagram illustrating a computing system environment for people search results according to an embodiment of the invention.

Referring to the drawings, FIG. 1 illustrates an example of a suitable computing system environment for displaying people search results according to aspects of the invention. Advantageously, embodiments of the invention leverage available information, such as distribution lists, security groups, and collaboration site memberships available through a directory server, web server, or the like, to present the people search result set to users in a meaningful way.

In the illustrated embodiment, a server 102 includes a storage device 104 that contains profiles 106 or other forms of contact information and the like. In one embodiment of the invention, a computer such as the server 102 is suitable for use in the other figures illustrated and described herein. Server 102 has one or more processors or processing units and a system memory. The server 102 has, for example, at least some form of computer readable media associated with it. Computer readable media, which include both volatile and nonvolatile media, removable and non-removable media, may be any available medium that may be accessed by a computing device. By way of example and not limitation, computer readable media comprise computer storage media, such as storage device 104, and communication media.

In one embodiment, the profiles 106 may be contained in a database on the storage device 104. Those skilled in the art will recognize that the storage device 104 may include volatile or nonvolatile, removable or non-removable media implemented in any method or technology for storage of information such as computer readable instructions, data structures, program modules or other data. For example, computer storage media suitable for implementing storage device 104 include RAM, ROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by server 102.

The profiles 106 include, for example, information relating to employees within an organization and/or business contacts of the organization. Additionally, the profiles 106 may include information relating to members of a group, members of family, or the friends and family of an individual. For convenience, the invention is described in the business organization context, but it should not be limited to such an embodiment.

In accordance with this embodiment of the invention, profiles 106 represent an employee or business contact of an organization and may include one or more of the following properties: Global Identifier, Security Identifier, Account Name, First Name, Last Name, Preferred Name, Work Phone, Office, Department, Title, Manager, About Me, Picture Uniform Resource Locator, User Name, Quick Links, Responsibilities, Skills, Past Projects, Interests, School, Birthday, Hire Date, Work Email, Cell Phone Number, Fax Number, Home Phone Number and Memberships. Additionally, a user 108 may designate one or more of the profiles 106 as a colleague.

A colleague, for example, is a person who has a direct relationship with the user 108. A colleague may be a friend, a co-worker, business associate, or other person that the user 108 knows. The colleague may be a person who the user 108 has actually met or a person who the user 108 has developed a relationship with through email, teleconferencing, or other means. The user 108 may have developed the relationship with the colleague through work assignments, social functions, professional meetings or associations, or other means. In one embodiment, a utility or an application may be implemented to suggest colleagues to the user 108. Advantageously, once the user 108 has identified or otherwise designated the profile 106 as a colleague, aspects of the invention determine if the user 108 has a direct relationship with the person associated with a particular one of the profiles 106 in the result set or if the user 108 has a direct relationship with a person who has a direct relationship with the person associated with the particular profile 106 in the result set. A people search result graphical user interface (GUI) 110 displays this information to the user according to aspects of the invention.

The user 108 accesses the people search result GUI 110 through a terminal or computer 112 in the embodiment illustrated in FIG. 1. The server 102 may operate in a networked environment using logical connections to one or more remote computers, such as a computer 112. The computer 112 may be a personal computer, a server, a router, a network PC, a peer device or other common network node, and typically includes many or all of the elements described above relative to server 102. The logical connection depicted in FIG. 1 includes a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

In one embodiment, user 108 enters search criteria through the people search result GUI 110 and a profile search component 116 executes the desired search. Those skilled in the art will understand that user 108 may enter commands and information into computer 112 to initiate the search through input devices or user interface selection devices, such as a keyboard 114 and a pointing device (e.g., a mouse, trackball, pen, or touch pad). Other input devices (not shown) may include a microphone, joystick, game pad, satellite dish, scanner, or the like. A monitor or other type of display device is also connected to system bus via an interface, such as a video interface. In addition to the monitor, computers often include other peripheral output devices (not shown) such as a printer and speakers, which may be connected through an output peripheral interface (not shown).

A design specification for one embodiment of people search result GUI 110 is as follows:

People Search Graphical User Interface Design:

The Search Center is the home of all major end user search activities; whether searching across everything or scoping a search to just Documents, Discussions or People. This design covers the People search scope in the Search Center.

People Search Results: There are 3 types of returned people search results each with 2 viewing styles.

People Search Result Types:
 1. General, shown in FIGS. 6 and 7 (general full text search & advanced search)
 2. Property, shown in FIGS. 8 and 9 (property value search)
 3. Name, shown in FIGS. 10 and 11 (name search)

All people result views shows a maximum of 20 results per page and only returns people (profiles) and nothing else.

Base People Result: The base people result has 9 elements.

Base People Result Elements:
 1) Name
 2) Picture
 3) Presence
 4) Title
 5) Department
 6) Work Phone
 7) Office
 8) About Me
 9) Add to My Colleagues link The Picture is displayed on the left and the Presence and Name are displayed on the first line. Title, Department, Work Phone and Office are all displayed on the second line. About Me is displayed on the third line and not to exceed two lines. The Add to My Colleagues link is displayed on the last line. If a base element is empty for a person that field should just not return, except in the case of a picture. If the user did not select a picture the default icon is shown in its place.

The 3 different results types can add something to the base; normally in the form of a hit result line. This is explained more under each result type.

People Results Views: The 2 viewing styles are either view by flat relevance or grouped by social distance.

View by Flat Relevance: The flat relevance view (shown in FIGS. 6, 8, and 10) is the standard search result view where the most relevant result appears at the top and the least relevant is at the bottom.

Group by Social Distance: The group by social distance view (shown in FIGS. 7, 9, and 11) regroups the page's returned search results by social distance in addition to relevance.

For example of if a search returned 23 people and the use was only to see 10 per page at a time the user is shown the most relevant 10 first.

This will still remain true when viewing results by social distance but instead of being order by relevance first (meaning most relevant to least relevant) they are ordered by social distance first, then relevance.

Group by social distance places each result into 1 of 3 groups in the following order: My Colleagues, My Colleague's Colleagues & Everyone Else. Within these groups the results are then ordered by relevance; so the top 10 results will still remain the top 10 results but grouped by social distance.

The search query will ask for 3 pages worth of results and regroup those results based on social distance.

People Search Results: General
A General Search result (shown in FIGS. 6 and 7) adds additional profile information to the last line of the base people result. The addition can include Responsibilities, Skills or Interests which where hit by the search string. The additional information is formatted in italicized text.

General search results uses hit highlighting. Hit highlighting is shown in the About Me/Description section and on the additional displayed profile properties. The About Me should truncate for hit highlighting as shown in the Kevin Corner example above.

A result should only display additional profile information, with corresponding label, is only shown on a result if the information was a hit for the search string. Multiple values for a property can be returned if more than one value is hit.

Hit highlighted properties are displayed relative to their property display order as set by the administrator. As a default the order is responsibilities, skills and then interests.

The default view for General search results is View by Social Distance.

People Search Results: Profile Property
A Profile Property Search result (shown in FIGS. 8 and 9) adds additional profile property information to the last line of the base people result. The additional information includes the label of the searched against profile property and all of the values for that property; placing the searched for value first in the list. The additional information is formatted in italicized text.

Profile Property search results uses hit highlighting just as with general search results; hit highlighting is shown on the search for profile property value.

The default view for Profile Property search results is Group by Social Distance.

Search String: <Property>: <Value>.

Profile property searches can also be triggered by clicking on a profile property value in a person's Portrait.

The search string is based on the search query language. To represent multiple properties each should have the property prefix.

People Search Results: Name
A Name Search result (shown in FIGS. 10 and 11) is the same as the base people search result.
Hit highlighting is not used in the name field.
The default view for Profile Property search results is View by Social Distance.

Search String
Searching for a name is equivalent when searching for full name or unique identifier such as UserId or alias. A name match has the strongest weight, much like a high confidence search result and should appear first in a result set before other results with hits in fields other than name.

High Confidence Results
People search results will show High confidence search results for exact unique matches on name or UserID (alias) matches only.

High confidence results will sit at the top of the results set highlighted in an orange box. High confidence results are separate from regular search results. A label explaining the highlighting is displayed in the tope right corner.

The high confidence result is only displayed on the first page.

Refinement: Users can refine a search by either using the refinement pane 206, modifying their search string or by clicking on profile property values exposed in the results set.

Refinement Pane: The Refinement pane has 3 sections: title; refine by Property; link to additional search options.

Refine by Property:
The refine by property sections shows in place, without expansion, a maximum of 5 property values for refinement and a link to see more values.

Each section is populated with the set of property values returned in the search results for that property. This will assist in minimizing the list to those that are likely to be relevant. The list is shown in order of frequency where the value that appears most is first and so on.

The view more link will expand the list in place out to a maximum of 20 values. If there are more than 20 only the first 20 are seen in the pane. Once expanded a link is exposed to collapse the list back to 5; just as with the Memberships and Colleagues web parts.

Each Refine by Property section has a heading which reads "Refine results by <Property Name>". The list of property values should be bulleted to express separation when wrapping occurs.

Clicking to refine by property value will re-query for the original search string but add an additional requirement to the search to only return people who has the clicked (selected) property/value pair. It's the equivalent of performing an advanced search where for property value equals X.

Refinement Pane Options: The Refinement pane is a web part and has 3 custom properties.

| Property Refinement Properties | Type Property Picker | Valid Values Profile Properties | Default Value(s) Department; Title |
|---|---|---|---|
| Max number to display | Textbox | Positive Integer | 20 |
| Values to display without Expansion | Textbox | 0-Max | 5 |

If a Value to display is equal to the maximum number that can be displayed (display=max) then the view more link is not displayed.

Property Weighting: People search should respect property weighting where certain profile property fields are weighted heavier than others.

The weighting order from heaviest to lightest:
Name (exact match)
Memberships
Responsibilities
About Me
Department
Skills
Interests
Title The profile search component 116 performs the search on the profiles 106 as a function of the input search criteria and is well known to those skilled in the art. In one embodiment, the profile search component 116 performs the search on the database containing the profiles. Appendix A contains exemplary code implementing database searching in accordance with one embodiment of the invention.

Although described in connection with an exemplary computing system environment, including server 102, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Figure 2:
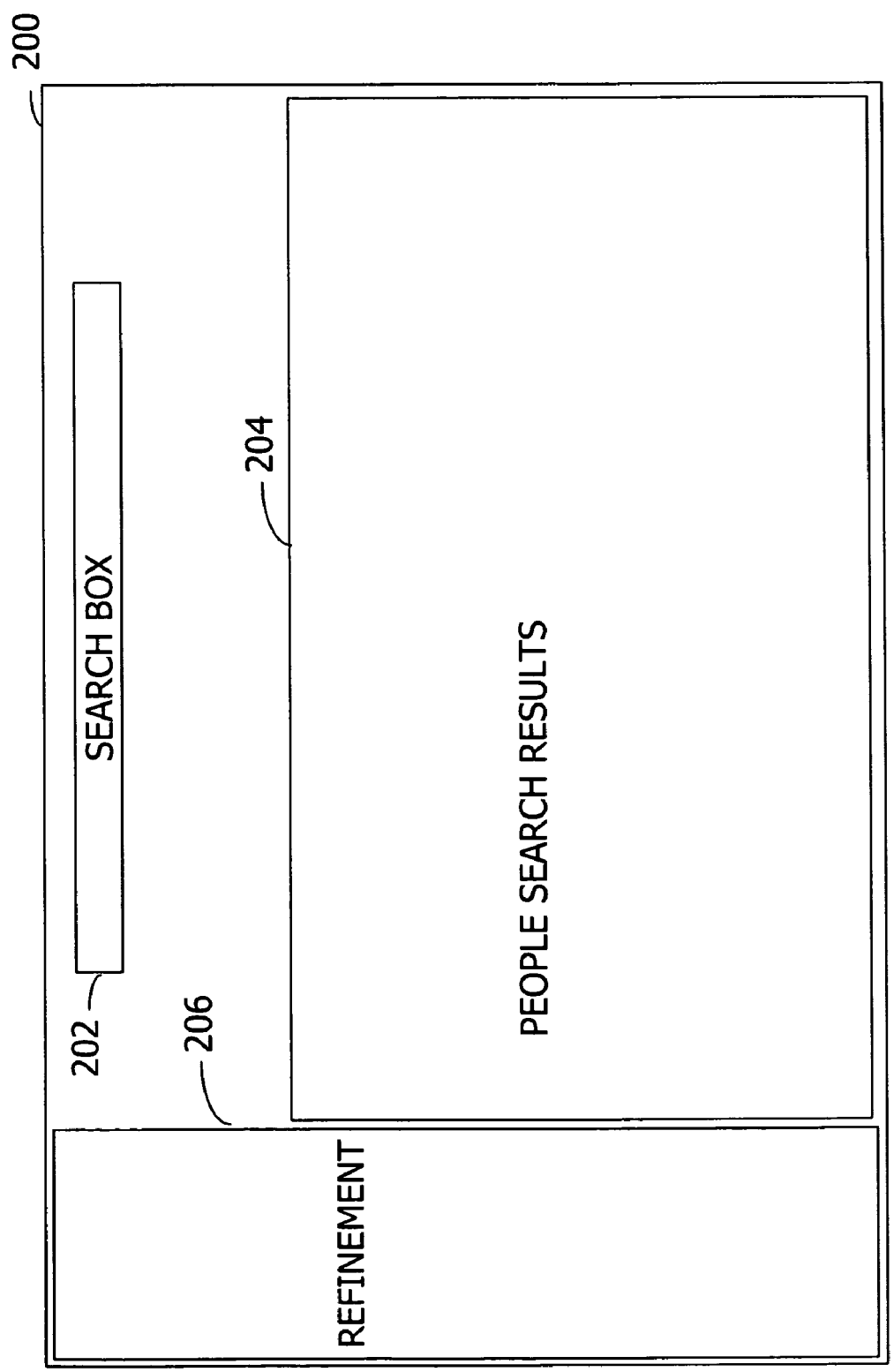
FIG. 2 is a block diagram illustrating an exemplary graphical user interface for people search results according to an embodiment of the invention.

FIG. 2 illustrates one embodiment of the people search result GUI 110 in the form of a people search GUI 200. The people search GUI 200 is divided into three main regions: a search box 202, a people search results area 204, and a refinement pane 206. The search box 202 allows the user 108 to input search criteria via the input device 114 of the computer 112. In one embodiment, the user 108 may search for a person by name, profile property, or subject.

The result set of profiles 106 returned by the profile search component 116 is rendered in the people search results area 204. In another embodiment, as a default, 20 profiles 106 per page are shown in the people search results area 204. A number of properties are shown for each of the profiles 106 listed in the people search results area 204. The properties include one or more of the following: Name, Picture, Presence, Title, Department, Work Phone, Office, About Me, "Add to My Colleagues" link, Responsibilities, Skills, Interests, Past Projects and Memberships.

Figure 8:

According to aspects of the invention, people search results area 204 permits viewing the result set in two viewing styles, namely, relevance as shown in FIGS. 6, 8, 10 and social distance as shown in FIGS. 7, 9, 11. In one embodiment, the user 108 may switch between the two views by selecting a link above the people search results area 204. Referring again to FIG. 2, in one embodiment, the relevance view is the default view. In this embodiment, the result set is ordered by relevance with the most relevant profile 106 in the result set appearing at the top of the people search results area 204 and the least relevant profile 106 being at the end of the result set. The relevance of each of the profiles 106 in the result set is calculated as a function of metadata created for the profile. The metadata is generated from one of more of the following: manager name affiliated with the profile; department name affiliated with the profile; distribution lists affiliated with the profile; security groups affiliated with the profile; collaboration server sites affiliated with the profile; and a property of the profile (e.g. Responsibilities, Past Projects).

In one embodiment of the invention, server 102 functions as a collaboration server, which provides enterprise-scale capabilities to meet business-critical needs like managing content and business processes, simplifying how people find and share information across boundaries, and enabling better informed decisions. Such a collaboration server supports intranets, extranets, and Web applications across an enterprise within one integrated platform, instead of relying on separate fragmented systems.

Relevance of the profiles 106 in the result set is increased by generating metadata from directory server groups (i.e., distribution lists and security groups) and the collaboration server sites where the user associated with profile collaborates to search for people associated with a particular subject or expertise. Advantageously, the generation of the metadata to determine relevance of the profile 106 in the result set leverages data already known in the environment for profiles 106 associated a particular project or subject and does not requires the user 108 to input more specific metadata in addition to the search criteria.

The social distance view groups the result set in the people search results area 204 by social distance. In one embodiment, the profiles are ordered by relevance within each social distance group. Grouping by social distance places each profile in the result set into one of three groups in the following order: My Colleagues, which corresponds to a first degree of social distance, are profiles 106 that the user 108 has designated as colleagues (i.e., the user 108 has a direct relationship with the person associated with the profile); My Colleague's Colleagues, which corresponds to a second degree of social distance, are profiles 106 that the colleague of the user 108 has designated as colleagues (i.e., the user 108 has a direct relationship with a person who has a direct relationship with the person associated with the profile); and Everyone Else, which corresponds to a social distance of three degrees or more, are profiles 106 that are not colleagues or colleagues of colleagues (i.e., the user 108 does not have a direct relationship with the person or does not have a direct relationship with a person who has a direct relationship with the person associated with the profile). Because people naturally find greater ease in contacting people they know or people that know someone they know whether directly or through an ad hoc brokering process, the grouping of the profiles 106 by social distance allows the user 108 to identify the people in the result set that he or she will feel more comfortable contacting. This also affects perceived relevance as the profiles 106 in the result set are associated with people that the user 108 would actually ask about searched subject or question.

The refinement pane 206 shown in FIG. 2 allows the user 108 narrow the result set shown in the people search results area 204 to target profiles 106 that the user 108 is most interested in. In an embodiment, the people search GUI 200 counts the number of times a value for the property of the profile appears in the result set and then renders the name of the property and a list of the values that appear the most often in the result set for the property in the refinement pane 206. The user 108 can then select a value for the property and the people search GUI 200 will render a subset of the result in the people search results area 204 where the property of the profile equals the selected value. In one embodiment, one or more indexed properties are shown in the refinement pane 206, and the properties include: Global Identifier, Security Identifier, Account Name, First Name, Last Name, Preferred Name, Work Phone, Office, Department, Title, Manager, About Me, Picture Uniform Resource Locator, User Name, Quick Links, Responsibilities, Skills, Past Projects, Interests, School, Birthday, Hire Date, Work Email, Cell Phone Number, Fax Number, Home Phone Number and Memberships. As a default, Department and Title properties and the corresponding values appear in the refinement pane 206; however, the user 108 may customize the refinement pane 206 by selecting one or more of the indexed properties listed above to appear with the refinement pane 206. In another embodiment, additional properties may be defined for a profile. As these properties are defined, the additional properties may be selected by the user 108 to customize the refinement pane 206.

Figure 3:
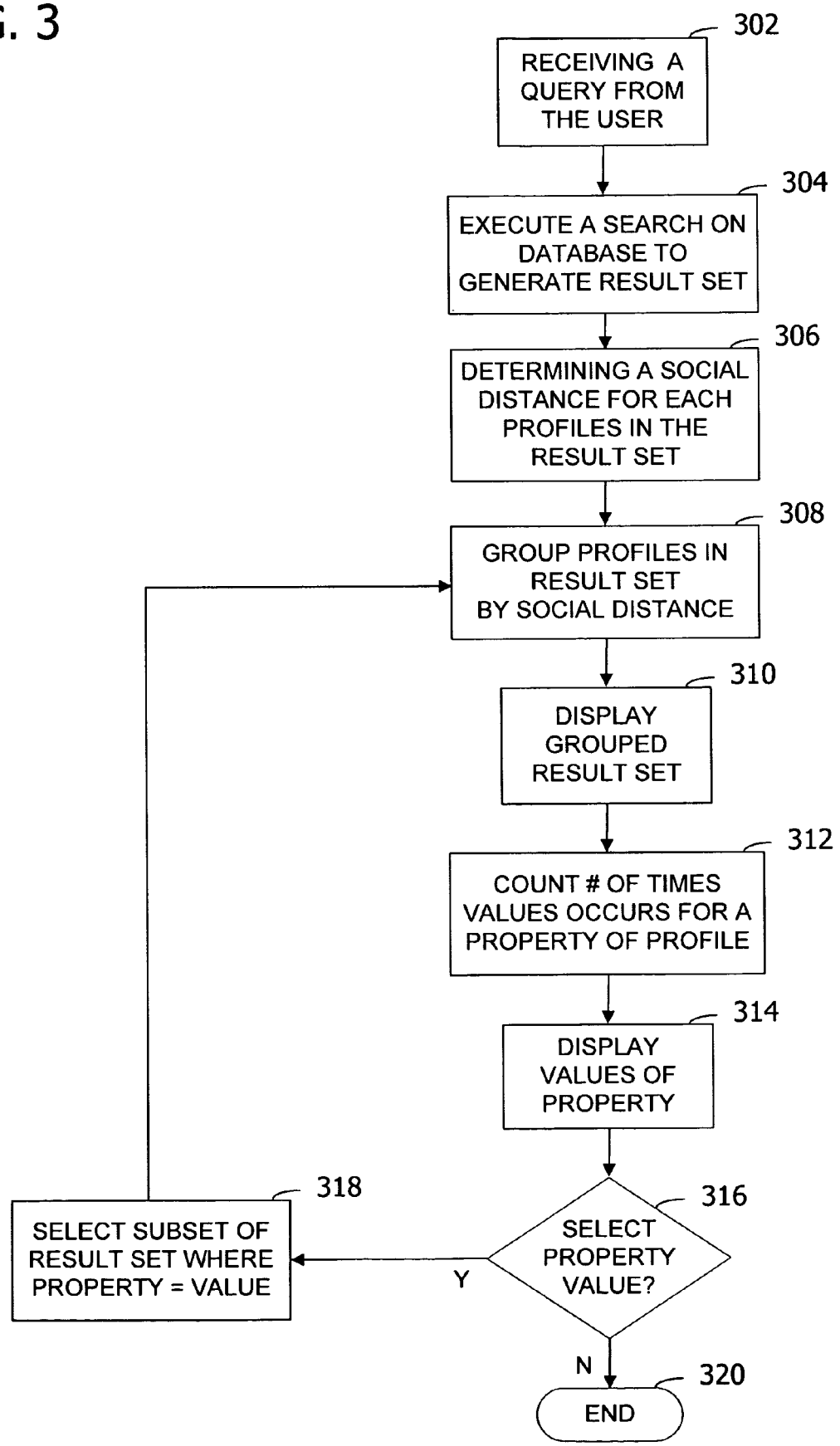
FIG. 3 is a flow diagram for one embodiment of displaying search results grouped by social distance according to an embodiment of the invention.

FIG. 3 is a flow diagram illustrating one embodiment of displaying search results grouped by social distance. At 302, a query is received from the user 108. The query is input into the search box 202 via the input device 114 of the computer 112. The query may be in any format recognized by the profile search component 116.

At 304, a search is executed on the profile database by the profile search component 116 to generate a result set of profiles 106 as a function of the received search criteria. The profile search component 116 performs the search on the profiles 106 as a function of the input search criteria and is well known to those skilled in the art. In one embodiment, the profile search component 116 performs the search of the profiles 106 contained within the database.

At 306, a social distance is determined for each of the profiles 106 in the result set as a function of the colleague designation of the profile. The user 108 may designate one or more profiles 106 as a colleague. The colleague designation indicates that the user 108 has a direct relationship with the person associated with the profile. In one embodiment, three degrees of social distance are determined based on the colleague designation. A first degree of social distance is assigned to profiles 106 the user 108 has designated as a colleague (i.e., the user 108 has a direct relationship with the person associated with the profile 106). A second degree of social distance is assigned to profiles 106 that a colleague of the user 108 has designated as a colleague (i.e., the user 108 has a direct relationship with a person who has a direct relationship with the person associated with the profile 106). A degree of social distance of three or more is assigned to profiles 106 that have not been assigned the first degree of social distance or the second degree of social distance (i.e., the user 108 does not have a direct relationship with the person associated with the profile and the user's colleagues do not have a direct relationship with the person associated with the profile 106).

Once the social distance of each profile in the result set has been determined, the user may group the profiles 106 according to the social distance at 308. In one embodiment, the profiles 106 are ordered by the relevance value of the profile within the groups. In another embodiment, the profiles 106 are ordered by the relevance values first, and then grouped by social distance. For example, suppose the people search GUI 200 is configured to display 10 profiles per page in the people search results area 204 and a result set of 23 profiles was returned from the search. First, the profiles 106 are ordered by the relevance value associated with the profile. Next, the profiles 106 are grouped by social distance on a per page basis. Thus, the 10 profiles, for example, with the highest relevance values will appear on the first page grouped by the determined social distance; the profiles 106 with the 10 next highest relevance values will appear on the second page grouped by the determined social distance; and the last 3 profiles 106 will appear on the third page grouped by the determined social distance.

At 310, the grouped result set is displayed in the people search results area 204 in order of social distance. The groups are displayed, for example, in the following order: My Colleagues, which corresponds to a first degree of social distance; My Colleague's Colleagues, which corresponds to a second degree of social distance; and Everyone Else, which corresponds to a social distance of three degrees or more. FIGS. 7, 9, and 11 illustrate examples of an embodiment of the invention where the profiles 106 have been grouped by social distance.

Referring again to FIG. 3, at 312, unique values for at least one profile property are determined and a count is generated to determine the number of times a value of the property occurs in the result set. In one embodiment, the number of times a value occurs in the result set is counted at the same time as each profile in the result set is displayed in the people search results area 204. As a default, values for Title and Department are counted.

At 314, the name of the property and values are displayed in the refinement pane 206. In one embodiment, the refinement pane 206 displays in place, without expansion, a maximum of five property values for refinement and a link to see more values. For each property listed in the refinement pane 206, a list of property values is displayed in decreasing count value. For example, suppose the result set contained 23 profiles 106 and the refinement pane 206 is configured to display values for the Department property. In the result set, four profiles 106 belong to the Public Relations Department, 10 profiles 106 belong to the Marketing Department, three profiles 106 belong to the Legal Department, and six profiles 106 belong to the Product Support Department. The name of the property counted, "Department" will appear in the refinement pane 206 followed by the values "Marketing", "Product Support", "Public Relations", and "Legal" in order. In another embodiment, a view more link is displayed if there are more than 5 values. If the user 108 selects the link, the list will expand to a maximum of 20 values.

At 316, the user 108 is given the opportunity to select a value from the refinement pane 206. If the user 108 has selected a value, at 318, a subset of the result set is selected where the profiles 106 include the selected value. In one embodiment, subset of the result set is generated by re-querying the database with the original search criteria plus additional search criteria specified to only return profiles 106 for the selected property/value pair. If the user 108 does not select a value at 316, the method terminates 320.

Figure 4:
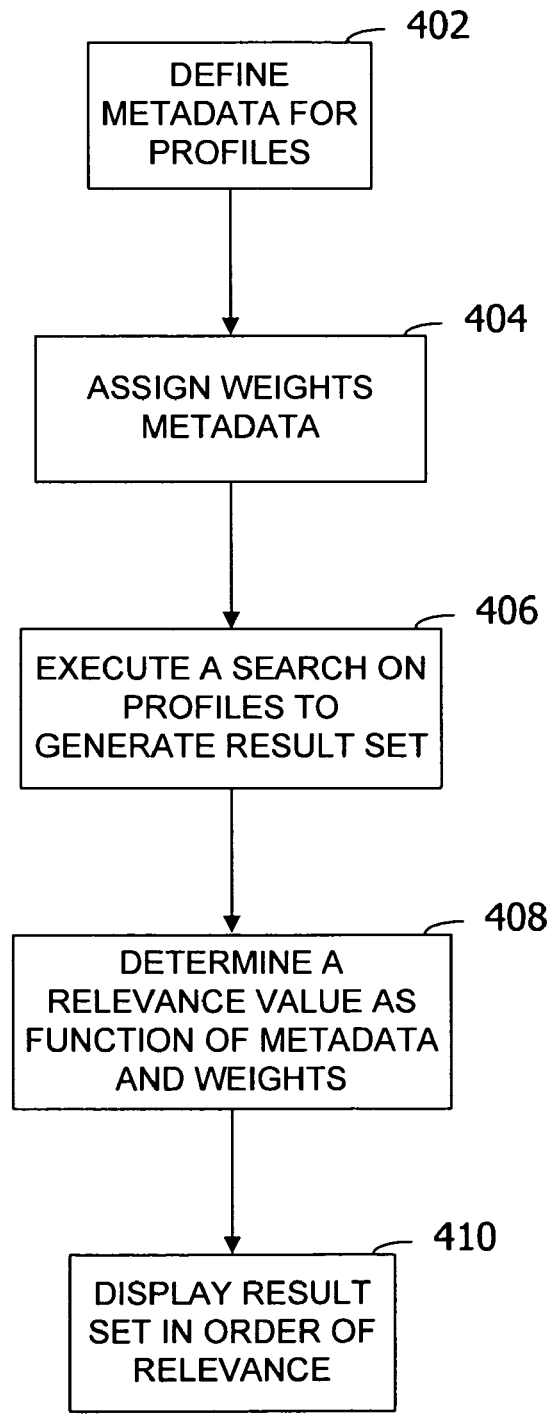
FIG. 4 is a flow diagram for one embodiment of a method for displaying profiles in the result set in order of relevance according to another embodiment of the invention.

FIG. 4 is a flow diagram illustrating one embodiment of a method for displaying profiles 106 in the result set in order of relevance. At 402, metadata is defined for the profiles 106 based on the group affiliations of the profile. In one embodiment, to further increase the ability to determine relevance from the metadata, metadata is generated for distribution lists within the distribution list associated with the profile. For example, if user name or global identifier of the profile appears in a first distribution list named "All Engineering", metadata is generated for the profile based on the name of the distribution list. Now suppose that the "All Engineering" distribution list includes a second distribution list, "Project Engineers". Additional metadata will be generated for the profile based on the name of the second distribution list, "Project Engineers". This process continues for all distribution lists associated with the first distribution list.

In another embodiment, at 404, weights are assigned to the metadata according the size of the group. In this embodiment, weighting is added to the metadata as function of size of the group used to generate the metadata. The weight is assigned to the metadata such that the smaller the group, the higher the weight of the metadata when used to determine relevance. For example, suppose the user 108 belongs to a security group, "All Engineers", with 1000 members and a collaboration server site named "Software Engineers" with 500 members. The metadata generated for the collaboration server site will be assigned a weight twice as large as the metadata generated for the security group because size of the security group, 1000, is twice the size of the collaboration server site, 500.

At 406, a search is executed on the database of storage device 104 to generate a result set as a function of the search criteria provided by the user 108 and the metadata. The use of the metadata improves the ability to find people associated with a profile in a particular subject area because people who work together often group themselves on an informal or ad hoc basis. For example, business and companies often have an official structure or organizational hierarchy, such as departments or job titles. But as people perform their job functions, they often collaborate across these formal boundaries and create distribution lists or security groups that define these collaborative groups (i.e. the company picnic committee). If the user 108 searches the profile database for "company picnic", he unlikely to generate results because it is unlikely that a company has a "Company Picnic" department. However, creating metadata for the profiles 106 based on their group memberships and allowing the user 108 search on such metadata, allows the user 108 to locate profiles 106 affiliated with such groups.

At 408, a relevance value is determined as a function of the metadata. The relevance value is assigned to profiles 106 as a function of metadata such that the higher the relevance value for the profile the more likely the user 108 is searching for that particular profile. In one embodiment, the relevance value is determined as a function of the metadata and the weights. In another embodiment, property weighting is implemented such that certain profile property fields are weighted heavier than others to determine the relevance of the profile in the result set. In this embodiment, the weighting order from heaviest to lightest: Name (exact match), Memberships, Responsibilities, About Me, Department, Skills, Interests and Title.

At 410, the result is displayed to the user 108 according to the relevance value of each of the profiles 106 in the result set in the search result area 204. In one embodiment, the result set is ordered such that the most relevant profile 106 in the result set appears first in the people search results area 204 and the least relevant profile 106 is at the end of the result set. FIGS. 6, 8 and 10 illustrate examples of an embodiment of the invention where the profiles 106 have ordered according to relevance.

Figure 5:
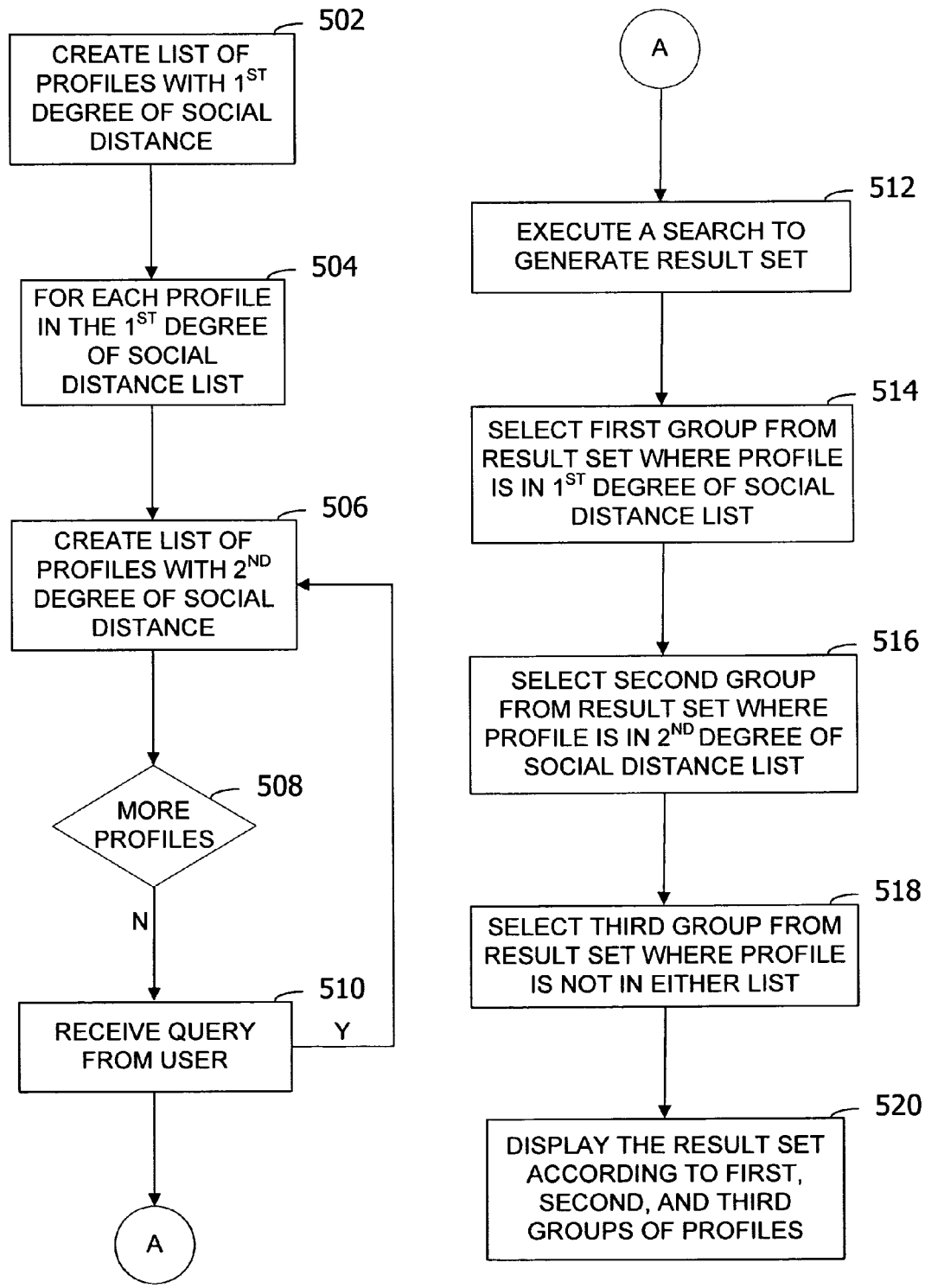
FIG. 5 is flow diagram of a method for grouping a result set of profiles according to social distance according to yet another embodiment of the invention.

FIG. 5 is flow diagram of a method for grouping a result set of profiles 106 according to social distance. At 502, a list of profiles 106 with a first degree of social distance is generated. As explained above, the first degree of social distance indicates that the user 108 has a direct relationship with the person associated with the profile and is indicated by a colleague designation of the profile. In one embodiment, the first degree of social distance list is generated by searching the database for profiles 106 where the user 108 has designated the profile a colleague.

At 504, for each profile in the first degree of social distance list, a list of profiles 106 with a second degree of social distance is generated at 506. As explained above, the second degree of social distance indicates the user 108 has a direct relationship with a person who has a direct relationship with the person associated with the profile. In one embodiment, each profile will only appear once in the second degree of social distance list and profiles 106 will only be added to the second degree of social distance list if the user 108 has permission to access the profile. In another embodiment, permission to access the profile is determined by at least one of the following: privacy settings of the profile and system policies. At 508, a check is made to determine if there are any more profiles 106 to be processed in the first degree of social distance list. If so, the process repeats at 506 for the next profile in the first degree of social distance list. If not, the process continues on to execute the search of the database to generate the result set of profiles 106 at 512.

At 514, a first group of profiles is selected from the result set where the profile 106 is in the first degree of social distance list. At 516, a second group of profiles is selected from the result set where the profile 106 is in the second degree of social distance list. And, at 518, a third group of profiles is selected from the result set where the profile 106 is not in the first degree of social distance list or in the second degree of social distance list (i.e. three or more degrees of social distance).

At 520, the result set is displayed to the user 108 according to the first, second, and third groups of profiles 106. In one embodiment, the groups are displayed in the following order: profiles 106 with a first degree of social distance, profiles 106 with a second degree of social distance, and profiles 106 with three or more degrees of social distance.

In operation, server 102 executes computer-executable instructions such as those illustrated in the figures to implement aspects of the invention, including the operations illustrated in FIGS. 3-5.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

People Search
People Scope
    DECLARE @id int, @id2 int
    EXEC dbo.proc_MSS_AddScope N'People', N'Search for people.', N'global', 1, 1, 1, NULL, 1, N'system', @id OUTPUT
    EXEC dbo.proc_MSS_AddMatchingRule @id, 0, 2, 0, 261, N'urn:content-class:SPSPeople', N'system', @id2 OUTPUT
    GO
Search Results
    Public sealed Class PeopleSearchCoreResults: SearchCoreResults
    {
      public override GetXPathNavigator( )
        {
        AddPeopleSpecificColumnsToRetrive( )
        If (display by social distance)
        {
        SearchHiddenObject.ResultsRequested=3*ResultsPerPage;
        XmlResults=SearchHiddenObject.CoreResults;
        XmlResults=SortResultsBySocialDistance(XmlResults);

```
    XmlResults=TrimResults(XmlResults);
    Return XmlResults.CreateNavigator( )
  }
  Else
  {
    Navigator=Base.GetXPathNavigator( )
    Foreach(xmlElement in this.ResponseDoc)
    {
      AddorUpdateDepartmentCounts(xmlElement);
      AddorUpdateTitleCounts(xmlElement);
    }
    Return Navigator;
  }
}
Private XmlDocument
SortResultsBySocialDistance(xmlResults)
{
  HashTable Colleagues=GetColleagues( )
  HashTable
  ColleaguesColleagues=GetColleaguesColleagues( )
  Foreach(xmlResult in xmlResults)
  {
    If(IsinHashTable(xmlResult, Colleagues))
    {
      AddToArrayList(xmlColleagues, xmlResult);
    }
    ElseIf(IsinHashTable (xmlResult, ColleaguesCol-
      leagues)
    {
      AddToArrayList (xmlColleaguesColleagues, xml-
        Result);
    }
    Else
    {
      AddToArrayList (xmlEveryOneElse, xmlResult)
    }
    AddorUpdateDepartmentCounts(xmlResult);
    AddorUpdateTitleCounts(xmlResult);
  }
  return ConcatXmlDocs(xmlColleagues, xmlCol-
    leaguesColleagues, xmlEveryOneElse)
}
Private void CreateHiddenControls( )
{
  CreateHiddenControlForDepartment( )
  CreateHiddenControlForTitle( );
}
}
```

What is claimed is:

1. A method of displaying search results to a user, said method comprising:

retrieving distribution lists by accessing a directory service;

generating metadata for profiles contained in a database, each of the profiles associated with a different person, one or more of the profiles including colleague designations that indicate direct relationships between one person and another person, the metadata for the profiles indicating, for each profile, distribution lists that include people associated with the profile;

calculating weights for the metadata for the profiles, wherein the weights are a function of size of distribution lists that include a person associated with the profile such that distribution lists that are smaller have higher weights than the distribution lists that are larger;

receiving a query from the user;

generating a result set by executing a search on the database, the result set comprising one or more of the profiles that satisfy the query;

assigning a relevance value to each of the profiles in the result set as a function of the metadata for the profiles, the relevance value indicating a likelihood that the user is searching for the profile and wherein the relevance values are assigned to the profiles as a function of the metadata and the calculated weights for the metadata;

determining a social distance for each of the profiles in the result set, said determined social distance being a function of the colleague designations included in the profile;

grouping the profiles in the result set by the determined social distance into one or more groups, each profile in a group having a common degree of social distance from the user and at least one of the groups representing a second level social distance from the user; and displaying, to the user, the profiles in the result set grouped by the determined social distance and in order of the relevance values assigned to the profiles in the result set.

2. The method of claim 1, wherein determining the social distance further comprises:

assigning a first degree of social distance to each of the profiles in the result set that includes the colleague designation indicating that the person associated with the profile has a direct relationship with the user.

3. The method of claim 1, wherein determining the social distance further comprises:

assigning a second degree of social distance to each of the profiles in the result set that includes the colleague designation indicating that the person associated with the profile has a direct relationship with at least one other person having a direct relationship with the user.

4. The method of claim 1, further comprising:

generating suggested colleague designations for the user.

5. The method of claim 1 wherein each of the profiles includes one or more of the following properties: Global Identifier, Security Identifier, Account Name, First Name, Last Name, Preferred Name, Work Phone, Office, Department, Title, Manager, About Me, Picture Uniform Resource Locator, User Name, Quick Links, Responsibilities, Skills, Past Projects, Interests, School, Birthday, Hire Date, Work Email, Cell Phone Number, Fax Number, Home Phone Number, and Memberships.

6. The method of claim 1, wherein each of the profiles includes one or more properties, and wherein the method further comprises:

counting the number of times a value occurs for one or more selected properties of the profiles in the result set;

displaying the values of the selected properties in descending order by the count;

receiving a selection, by the user, of one of the displayed values; and displaying a subset of the result set, said subset containing the profiles that include the selected value.

7. The method of claim 1, wherein generating the metadata for the profiles comprises:

identifying a first distribution list affiliated with a given profile, the given profile being one of the profiles;

defining the metadata for the given profile as a function of the identified first distribution list;

identifying a second distribution list affiliated with the first distribution list; and defining the metadata for the given profile as a function of the second distribution list.

8. A method of providing search results to a user, the method comprising:
- retrieving distribution lists by accessing a directory service;
- generating metadata for profiles contained in a database, each of the profiles associated with different people, one or more of the profiles including colleague designations that indicate direct relationships between one person and another person, the metadata for the profiles indicating, for each profile, distribution lists that indicate the people associated with the profile;
- receiving a request from a user;
- assigning a weight to each of the profiles as a function of sizes of the distribution lists that include the people associated with the profile, such that smaller ones of the distribution lists have higher weights than larger ones of the distribution lists;
- generating a result set by executing a search on the database, the result set comprising ones of the profiles in the database that satisfy the query;
- assigning a relevance value to each of the profiles in the result set as a function of the metadata for the profiles in the result set and the weights assigned to the profiles in the result set, the relevance value assigned to the profile in the result set indicating likelihoods that the user is searching for the profile;
- determining a social distance for each of the profiles in the result set, said determined social distance being a function of the colleague designations included in the profiles, wherein determining the social distance for the profiles in the result set comprises:
  - assigning a first degree of social distance to each of the profiles in the result set that includes the colleague designation indicating that the person associated with the profile has a direct relationship with the user; and
  - assigning a second degree of social distance to each of the profiles in the result set that includes the colleague designation indicating that the person associated with the profile has a direct relationship with at least one other person having a direct relationship with the user;
- grouping the profiles in the result set by the determined social distance into one or more groups, each profile in a group having a common degree of social distance from the user and at least one of the groups representing a second level social distance from the user; and
- displaying, to the user, the profiles in the result set grouped by the determined social distance and then in order of the relevance values assigned to the profiles in the result set.

9. The method of claim 8, wherein each of the profiles is assigned the second degree of social distance list only if the user has permission to access that profile.

* * * * *